United States Patent
Tachibana

(10) Patent No.: US 8,684,216 B2
(45) Date of Patent: Apr. 1, 2014

(54) CLOSING MEMBER FOR OPENING

(75) Inventor: Kazuki Tachibana, Aichi (JP)

(73) Assignee: Mitsubishi Aircraft Corporation, Aichi (JP)

( * ) Notice: Subject to any disclaimer, the term of this patent is extended or adjusted under 35 U.S.C. 154(b) by 0 days.

(21) Appl. No.: 13/511,496

(22) PCT Filed: May 11, 2011

(86) PCT No.: PCT/JP2011/002607
§ 371 (c)(1),
(2), (4) Date: May 23, 2012

(87) PCT Pub. No.: WO2011/145291
PCT Pub. Date: Nov. 24, 2011

(65) Prior Publication Data
US 2013/0062352 A1 Mar. 14, 2013

(30) Foreign Application Priority Data

May 17, 2010 (JP) ................................. 2010-112782

(51) Int. Cl.
*B65D 45/30* (2006.01)
*B64C 1/14* (2006.01)

(52) U.S. Cl.
USPC .......................... 220/327; 220/378; 244/129.4

(58) Field of Classification Search
USPC ................. 220/378, 327; 244/129.4
See application file for complete search history.

(56) References Cited

U.S. PATENT DOCUMENTS

| 4,428,867 A * | 1/1984 | Billias et al. .................. 252/512 |
| 4,530,443 A | 7/1985 | Gorges |
| 4,579,248 A | 4/1986 | Gorges |
| 7,576,922 B2 | 8/2009 | Stempel et al. |
| 8,443,575 B1 * | 5/2013 | Tanner et al. ................ 52/784.1 |
| 2007/0133103 A1 | 6/2007 | Stempel et al. |
| 2007/0207421 A1 | 9/2007 | Heeter |
| 2009/0166473 A1 * | 7/2009 | Zuniga Sagredo ......... 244/129.4 |
| 2012/0187247 A1 * | 7/2012 | Delgado Jareno et al. 244/129.5 |

FOREIGN PATENT DOCUMENTS

| JP | 60-131395 A | 7/1985 |
| JP | 2001-004031 A | 1/2001 |
| JP | 2009-519479 A | 5/2009 |

OTHER PUBLICATIONS

International Search Report for PCT/JP2011/002607; Jul. 19, 2011.
International Preliminary Report on Patentability for PCT/JP2011/002607 dated May 11, 2011.
Japanese Office action for Application No. 2010-112782 dated Aug. 28, 2013.

* cited by examiner

*Primary Examiner* — Anthony Stashick
*Assistant Examiner* — James N Smalley
(74) *Attorney, Agent, or Firm* — Pearne & Gordon LLP

(57) ABSTRACT

An object is to provide a closing member for an opening, the closing member capable of more reliably maintaining a lightning-protective function. In addition to a first insulator 63, a second insulator 65 is provided between a door body 30 and a wing inner surface 11*b* around an opening 12. When the first insulator 63 falls off, the second insulator 65 becomes interposed between an inner peripheral planar part 64 and the wing inner surface 11*b*. With the first insulator 63 being tightly interposed between an outer peripheral planar part 62 and the wing inner surface 11*b*, the second insulator 65 faces the wing inner surface 11*b* with a predetermined clearance C therebetween. The outer peripheral planar part 62 is formed at a position further away from the wing inner surface 11*b* than an apical surface 65*a* of the second insulator 65 mounted on the inner peripheral planar part 64.

8 Claims, 7 Drawing Sheets

CLOSING MEMBER FOR OPENING

TECHNICAL FIELD

The present invention relates to a closing member for an opening provided in an airframe of an aircraft.

BACKGROUND ART

A main wing of an aircraft has a hollow structure with wing surface panels forming wing surfaces mounted above and below spar materials. In general, this main wing has an inner space used as a fuel tank.

Further, in order to perform an inspection and maintenance operation and other operations on the inside of the fuel tank, an opening is formed on a surface of the main wing. At normal time, this opening is closed by an access door. When an inspection and maintenance operation or another operation is performed, the access door is opened.

The access door is configured of a door body placed on an inner space side of the main wing with respect to the opening and a clamp ring placed on an outer side of the main wing.

The door body and the clamp ring each have an external dimension larger than that of the opening. With the edge part of the opening being interposed by the outer peripheral part of the door body and the outer periphery part of the clamp ring, the door body and the clamp ring are fastened together with fastener members or the like, thereby closing the opening by the door body.

In an aircraft, there is a possibility of occurrence of an arc or spark at the time of lightning. Thus, to prevent the ignition of flammable gas in the fuel tank, a reliable lightning-protection measure is required at a joint portion between the access door and its surrounding opening on a main wing side.

To this end, a configuration is conventionally adopted in which a ring-shaped insulating material is interposed between the outer peripheral part of the door body placed on the inner side of the main wing and the opening on a main wing side (for example, refer to Patent Documents 1 to 3). In this configuration, with the insertion of the insulating material, the outer peripheral part of the door body and the main wing side are prevented from being electrically in direct contact with each other, thereby preventing an arc or spark from occurring from this portion into the fuel tank.

CITATION LIST

Patent Documents

Patent Document 1: U.S. Pat. No. 4,579,248
Patent Document 2: U.S. Pat. No. 4,530,443
Patent Document 3: U.S. Pat. No. 7,576,922

SUMMARY OF THE INVENTION

Technical Problems to be Solved by the Invention

However, in the configuration as described above, when the insulating material falls off, the lightning-protective function is disadvantageously impaired. The reason for this is as follows. The access door is opened and closed for maintenance and other purposes. The insulating material is boned to the outer peripheral part of the door body, and may possibly fall off from the door body with repeated opening and closing. If the door body is mounted on the opening on the main wing without awareness of the falling-off of the insulating material, there is a possibility that the door body and the main wing are electrically in direct contact with each other.

The present invention is accomplished based on this technical problem, and has an object of providing a closing member for an opening, the closing member capable of more reliably maintaining a lightning-protective function.

Solution to the Problems

The present invention accomplished based on the object is directed to a closing member for an opening formed on a panel configuring an outer surface of an airframe of an aircraft. The closing member includes a closing member body placed on one surface side of the panel and having an external dimension larger than an external dimension of the opening to close the opening, a ring-shaped clamp member placed on an other surface side of the panel and having an external dimension larger than the external dimension of the opening, and a fastener fastening the closing member body and the clamp member together, with the panel being interposed between an outer peripheral part of the closing member body and an outer peripheral part of the clamp member. And, the closing member includes a first spacer and a second spacer lied between the outer peripheral part of the closing member body and a facing surface facing the outer peripheral part of the closing member body around the opening. The first spacer is interposed between the outer peripheral part of the closing member body and the facing surface, with the opening closed with the closing member body. The second spacer is interposed between the outer peripheral part of the closing member body and the facing surface at least in a state in which the first spacer has fallen off.

Accordingly, when the first spacer falls off, the second spacer is interposed between the outer peripheral part of the closing member body and the facing surface, and therefore a clearance can be ensured between the closing member body and the panel.

These first spacer and second spacer may be provided in plural so as to be spaced apart from each other in a circumferential direction of the closing member body. At least one of the first spacer and the second spacer is preferably in a ring shape continuous in a circumferential direction of the closing member body.

With the first spacer being interposed between the outer peripheral part of the closing member body and the facing surface, the second spacer can be configured to have a clearance between the outer peripheral part of the closing member body and the facing surface.

Furthermore, a portion facing the first spacer in the outer peripheral part of the closing member body is formed to have a clearance between the portion and the facing surface in a state in which the first spacer falls off and the second spacer is interposed between the outer peripheral part of the closing member body and the facing surface. With this, an arc or spark at the time of lightning can be reliably prevented from occurring between the closing member body and the panel.

The first spacer and the second spacer may be formed of the same material, but are preferably formed of different materials.

The second spacer can be formed of a material softer than a material of the first spacer, and can be configured to be interposed between the outer peripheral part of the closing member body and the facing surface, with the first spacer being interposed between the outer peripheral part of the closing member body and the facing surface.

Between the outer peripheral part of the closing member body and the facing surface, a seal member is provided, the seal member being in a ring shape continuous in a circumferential direction of the closing member body and ensuring fluid tightness between the outer peripheral part of the closing member body and the facing surface. While the first spacer and the second spacer can be provided separately from the sealing member, the sealing member can also function as the second spacer.

In this case, in order to prevent the sealing member from being crushed to be unable to ensure a clearance between the closing member body and the panel, the sealing member preferably has a core and a seal part formed of a material more pliable than a material of the core.

While the opening may be provided at any position on the aircraft and for any purpose, the opening is particularly effective when provided on a main wing configuring the airframe and at an entrance to or an exit from a fuel tank accommodated in the main wing.

Advantageous Effects of Invention

According to the present invention, when the first spacer falls off, the second spacer is interposed between the outer peripheral part of the closing member body and the facing surface, and therefore a clearance can be ensured between the closing member body and the panel. With this, the lightning-protective function can be more reliably maintained.

DESCRIPTION OF EMBODIMENTS

This invention is described in detail below based on embodiments shown in the attached drawings.

Figure 1:
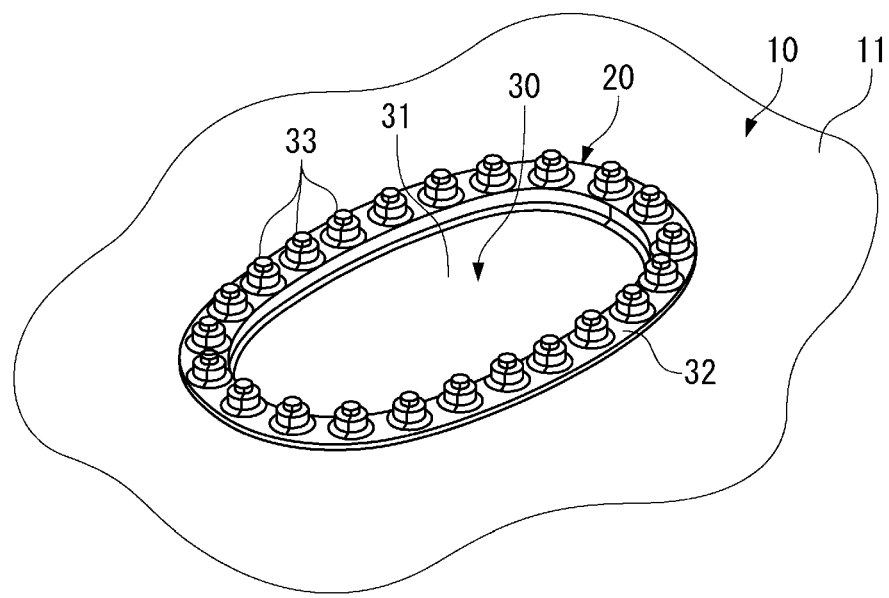
FIG. 1 is a perspective view showing an access door provided on a main wing of an aircraft according to an embodiment.

FIG. 1 is a perspective view of an access door (a closing member) 20 provided on a main wing 10 configuring the airframe of an aircraft to which the closing member for an opening in the present embodiment is applied, the view viewed from the inside of the main wing 10.

The access door 20 is provided on a wing surface panel (a panel) 11 forming a surface on upper or lower side of the main wing 10 so as to allow a maintenance worker to enter or exit from a fuel tank provided in an inner space of the main wing 10.

Figure 2:
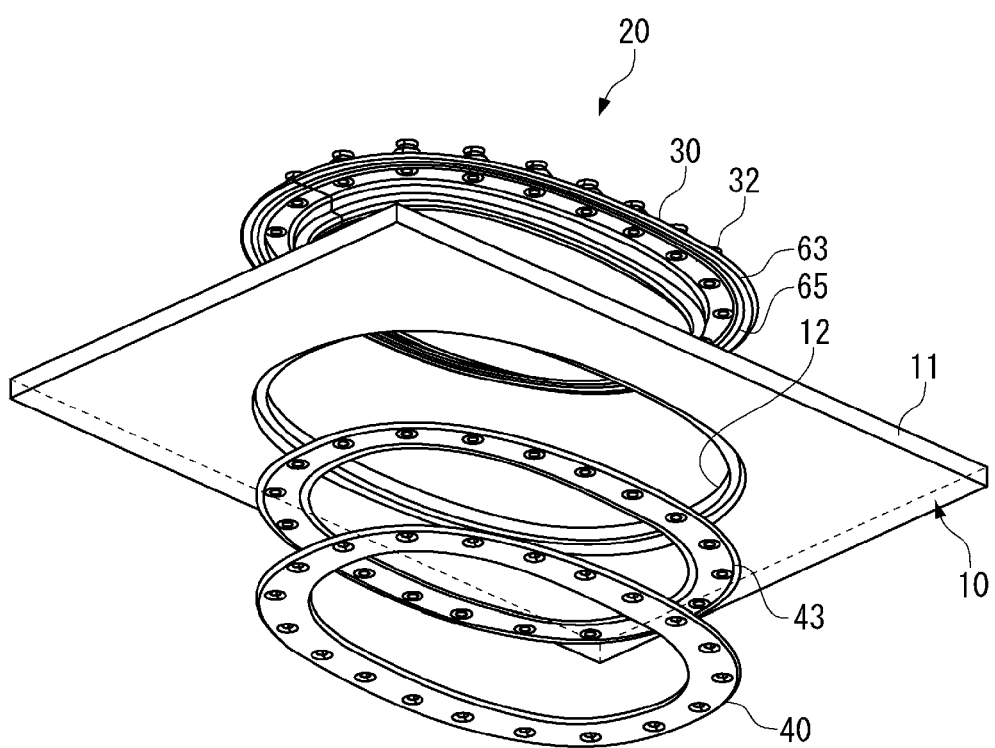
FIG. 2 is a perspective development view of the access door.
Figure 3:
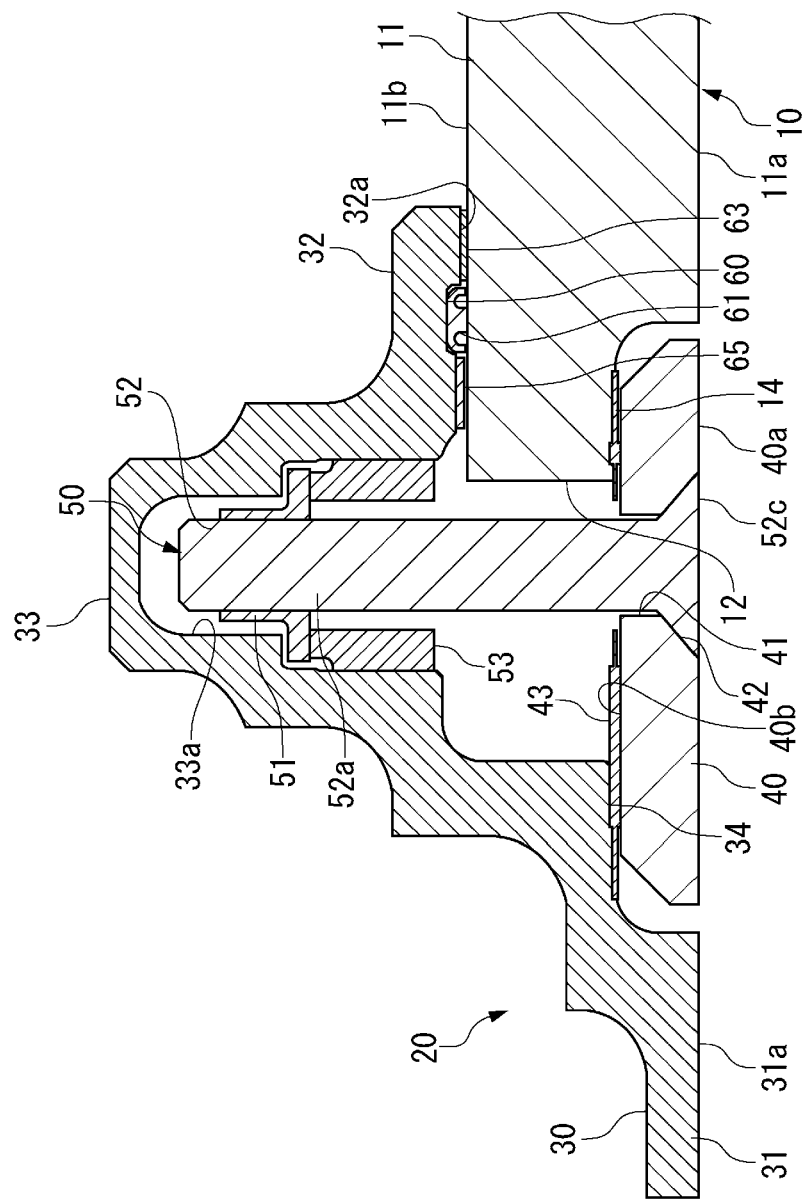
FIG. 3 is a sectional view showing a mount structure of the access door on a wing surface panel of the main wing.

As shown in FIG. 2 and FIG. 3, an opening 12 communicating with the inside and outside of the main wing 10 is formed on the wing surface panel 11. This opening 12 can be in a shape as appropriate, for example, in an oval type, an elliptical shape, or a circular shape.

The access door 20 is configured of a door body (a closing member body) 30 placed on an inner space side of the main wing 10 with respect to the opening 12, a clamp ring (a clamp member) 40 placed on an outer side of the main wing 10, and fastening members (fasteners) 50 fastening the door body 30 and the clamp ring 40 together.

The door body 30 has an external dimension larger than that of the opening 12. The door body 30 includes a plate part 31 having an outer surface 31a forming a surface continuous to a wing outer surface 11a of the wing surface panel 11 and having an external dimension smaller than that of the opening 12 and a flange part 32 integrally formed with an outer peripheral part of the plate part 31 and abutting on the perimeter of the opening 12 on the inner space side of the main wing 10.

The flange part 32 includes an abutting surface 32a abutting on the perimeter of the opening 12 on the inner space side of the main wing 10 and a receiving part 33 for a relevant one of the fasteners 50 formed at a portion facing the clamp ring 40 on an inner side of the abutting surface 32a.

A plurality of receiving parts 33 are provided along a circumferential direction of an outer peripheral part of the door body 30, corresponding to positions for placement of the fastener members 50.

Each receiving part 33 is provided to project toward the inner space side of the main wing 10 and is formed with a recessed part 33a opening on a side facing the clamp ring 40. And, a nut 51 configuring the fastener member 50 is held with a retainer 53 in the recessed part 33a, and also a shank part 52a of a fastener body 52 configuring the fastener member 50 is accommodated therein.

The clamp ring 40 forms a ring shape having an outer diameter larger than the inner diameter of the opening 12 and an inner diameter smaller than the inner diameter of the opening 12. The clamp ring 40 has a rectangular shape in section, has an outer surface 40a, which is outside of the main wing 10, forming a surface continuous to the wing outer surface 11a of the wing surface panel 11, and has a facing surface 40b facing the receiving part 33 of the door body 30 is formed in parallel to the outer surface 40a.

On the clamp ring 40, a through hole 41 penetrating through the outer surface 40a and the facing face 40b is formed at a position corresponding to the receiving part 33 of the door body 30. Through each through hole 41, the shank part 52a of the fastener member 50 is inserted. In each through hole 41, a tapered bearing surface 42 for accommodating a head 52c of the fastener member 50 is formed on a side facing the outer surface of the main wing 10.

On the outer peripheral part of the plate part 31 described above, an abutting surface 34 abutting on an inner peripheral side of the facing surface 40b of the clamp ring 40 is formed.

Also, on an inner peripheral part of the opening 12 of the wing surface panel 11, an abutting surface 14 abutting on the outer peripheral side of the facing surface 40b of the clamp ring 40 is formed.

And, the clamp ring 40 is mounted so as to abut on the abutting surfaces 14 and 34 via a gasket 43.

In the state in which the opening 12 is closed, the access door 20 as described above has an inner edge part of the opening 12 interposed between the abutting surface 32a of the flange part 32 of the door body 30 and the facing surface 40b of the clamp ring 40. And, the fastener body 52 of the fastener member 50 is inserted from outside the main wing 10 into the through hole 41 of the clamp ring 40, and the nut 51 is screwed into the shank part 52a, thereby fastening the door body 30 and the clamp ring 40.

Figure 4:
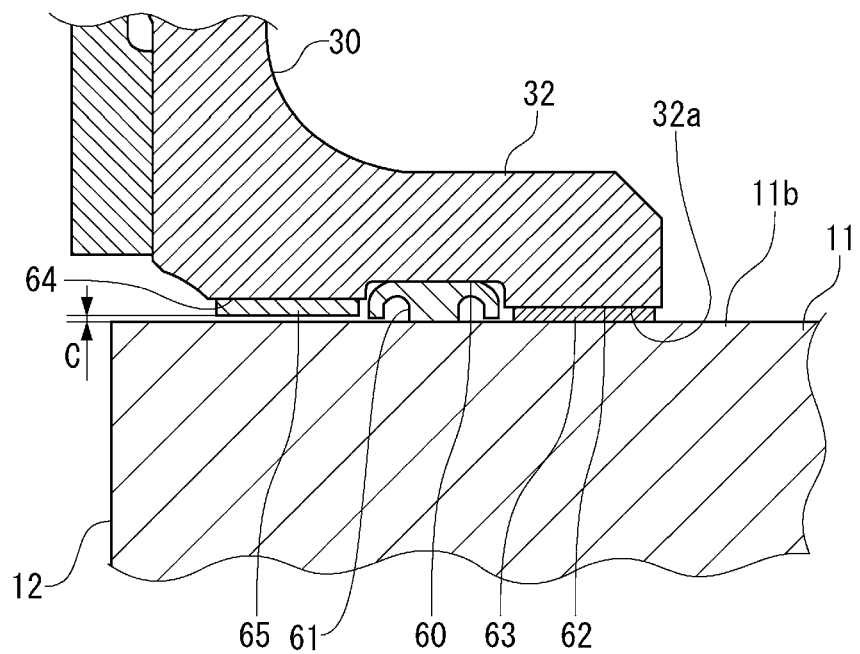
FIG. 4 is an enlarged sectional view of FIG. 3.

Meanwhile, as shown in FIG. 4, in this configuration, a ring groove 60 continuous in a circumferential direction of the door body 30 is formed on the abutting surface 32a of the flange part 32 of the door body 30. A ring-shaped fuel sealing member (a sealing member) 61 made of a rubber-based material is fitted in the ring groove 60. The fuel sealing member 61 lies between the flange part 32 and the wing inner surface 11b of the wing surface panel 11, thereby preventing leakage of fuel.

On the abutting surface 32a, a first insulator (a first spacer) 63 having an annular shape and a predetermined thickness is interposed between an annular outer peripheral planar part 62 positioned on an inner peripheral side of the ring groove 60 and the wing inner surface 11b of the wing surface panel 11. Here, the first insulator 63 is made of, for example, a phenolic resin, and is bonded to the outer peripheral planar part 62 with an adhesive.

Also, on the abutting surface 32a, a second insulator (a second spacer) 65 having an annular shape and a predetermined thickness is provided between an annular inner peripheral planar part 64 positioned on an outer peripheral side of the ring groove 60 and the wing inner surface 11b of the wing surface panel 11. Here, the second insulator 65 is made of, for example, a glass fiber reinforced resin, and is bonded to the inner peripheral planar part 64 with an adhesive.

Figure 5:
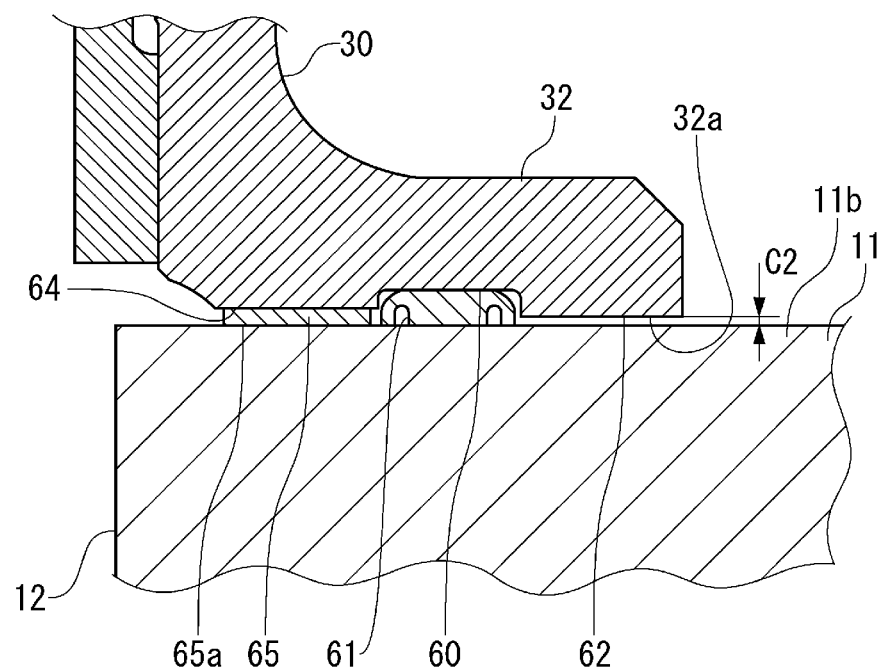
FIG. 5 is a sectional view showing the state of a first insulator falling off.

In the above-described manner, in addition to the first insulator 63, the second insulator 65 is also included between the door body 30 and the wing inner surface 11b around the opening 12. With this, at normal time, the first insulator 63 is interposed between the outer peripheral planar part 62 and the wing inner surface 11b, thereby preventing the door body 30 and the wing inner surface 11b from being electrically in direct contact with each other. And, as shown in FIG. 5, when the first insulator 63 falls off, the second insulator 65 is interposed between the inner peripheral planar part 64 and the wing inner surface 11b, thereby preventing the door body 30 and the wing inner surface 11b from being electrically in direct contact with each other. Even when the first insulator 63 falls off, it is possible to prevent an arc or spark from occurring at the time of lightning.

Here, as shown in FIG. 4, with the first insulator 63 being tightly interposed between the outer peripheral planar part 62 and the wing inner surface 11b by a fastening force of the fastener member 50, the second insulator 65 bonded to the inner peripheral planar part 64 faces the wing inner surface 11b with a predetermined clearance C. With this, at normal time, the second insulator 65 is in non-contact with the wing inner surface 11b. Even if the door body 30 is repeatedly attached onto and removed from the opening 12, the fastening force of the fastener member 50 does not act on the second insulator 65, and the second insulator 65 can be prevented from being peeled off.

Also, the first insulator 63 and the second insulator 65 are formed of different materials, the risk of being peeled off due to the same factor can be avoided.

Furthermore, the outer peripheral planar part 62 is formed at a position further away from the wing inner surface 11b than an apical surface 65a of the second insulator 65 mounted on the inner peripheral planar part 64. With this, as shown in FIG. 5, even if the first insulator 63 falls off and the second insulator 65 becomes in a state of being interposed between the inner peripheral planar part 64 and the wing inner surface 11b, a predetermined clearance C2 allowing prevention of occurrence of an arc or spark at the time of lightning is ensured between the outer peripheral planar part 62 and the wing inner surface 11b.

Figure 6:
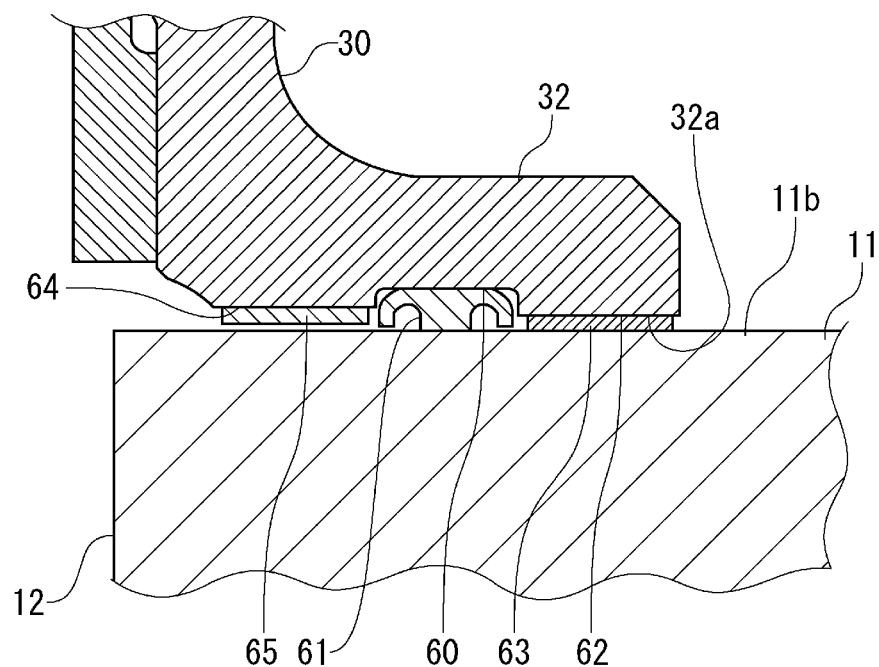
FIG. 6 is a sectional view showing another example of the mount structure of the access door on the wing surface panel of the main wing.

Note that while the second insulator 65 is configured to face the wing inner surface 11b with the predetermined clearance C, with the first insulator 63 being tightly interposed between the outer peripheral planar part 62 and the wing inner surface 11b, in the above embodiment, this is not meant to be restrictive. That is, as shown in FIG. 6, the second insulator 65 may be interposed between the inner peripheral planar part 64 and the wing inner surface 11b, with the first insulator 63 being tightly interposed between the outer peripheral planar part 62 and the wing inner surface 11b. In this case, the second insulator 65 is formed of a material softer than the material of the first insulator 63 and, when a fastening force of the fastening member 50 acts, a force of the door body 30 and the wing inner surface 11b being pressed to each other is preferably exerted mainly by the first insulator 63.

Figure 7:
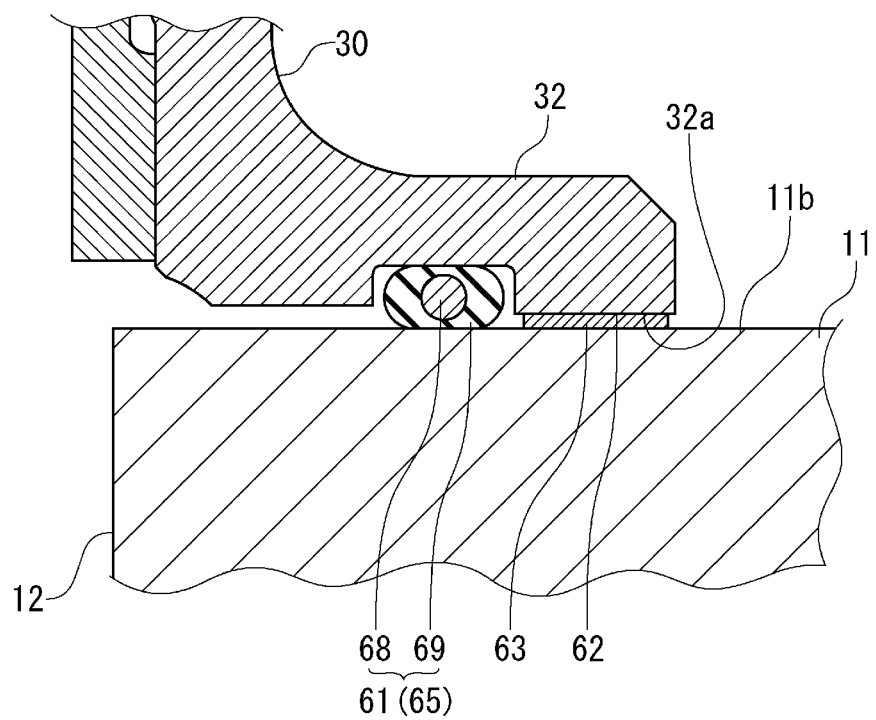
FIG. 7 is a sectional view showing still another example of the mount structure of the access door on the wing surface panel of the main wing.

Also, the configuration can be such that the fuel sealing member 61 is caused to function as the second insulator 65. In this case, as shown in FIG. 7, the fuel sealing member 61 preferably includes a core 68 made of, for example, PEEK, or the like, having a sufficient strength that can sustain the fastening force of the fastener member 50 and a seal part 69 provided to the outer peripheral part of the core 68 and made of a rubber-based material or the like softer than the material of the core 68. With this, when the first insulator 63 falls off, the fuel sealing member 61 as the second insulator 65 is interposed between the inner peripheral planar part 64 and the wing inner surface 11b, and the core 68 prevents the door body 30 and the wing inner surface 11b from being electrically in direct contact with each other.

Also, the configuration may be such that the cross-sectional area, density, an others of the fuel sealing member 61 are set so that the door body 30 and the wing inner surface 11b are not electrically in direct contact with each other even when the first insulator 63 falls off and the fuel sealing member 61 is interposed between the inner peripheral planar part 64 and the wing inner surface 11b to be crushed inside the ring groove 60.

Note that while the door body 30 and the clamp ring 40 are described in the above embodiment, their fastening structure, the shapes of the door body 30 and the clamp ring 40, and others are not intended to be restricted to the above, and can be configured in another manner as appropriate.

Also, the materials of the first insulator 63 and the second insulator 65 are not restricted to the above-listed materials. Other than the above, any of materials including polyimide, PET, ethylene-based resin, and others can be used as long as it satisfies necessary conditions, such as insulation properties, heat resistance, oil resistance, and adhesiveness.

Other than the above, the configurations cited in the above described embodiment can be selected or omitted, or can be arbitrarily changed to the other configurations, without departing from the gist of the present invention.

REFERENCE SIGNS LIST

10 ... main wing, 11 ... wing panel (panel), 12 ... opening, 20 ... access door (closing member), 30 ... door body (closing member body), 31 ... plate part, 32 ... flange part, 32a ... abutting surface, 40 ... clamp ring (clamp member), 40b ... facing surface, 41 ... through hole, 50 ... fastener member (fastener), 61 ... fuel sealing member (sealing member), 62 ... outer peripheral planar part, 63 ... a first insulator (first spacer), 64 ... inner peripheral flat surface, 65 ... second insulator (second spacer), 68 ... core, 69 ... seal part

The invention claimed is:
1. A closing member for an opening formed on a panel configuring an outer surface of an airframe of an aircraft, the closing member comprising:
a closing member body placed on one surface side of the panel and having an external dimension larger than an external dimension of the opening to close the opening;

a ring-shaped clamp member placed on an other surface side of the panel and having an external dimension larger than the external dimension of the opening; and a fastener fastening the closing member body and the clamp member together, with the panel being interposed between an outer peripheral part of the closing member body and an outer peripheral part of the clamp member, and the closing member comprising a first spacer and a second spacer lied between the outer peripheral part of the closing member body and a facing surface facing the outer peripheral part around the opening, the first spacer being interposed between the outer peripheral part of the closing member body and the facing surface, with the opening closed with the closing member body, and the second spacer being interposed between the outer peripheral part of the closing member body and the facing surface at least in a state in which the first spacer has fallen off, wherein, with the first spacer being interposed between the outer peripheral part of the closing member body and the facing surface, the second spacer has a clearance between the outer peripheral part of the closing member body and the facing surface.

2. A closing member for an opening formed on a panel configuring an outer surface of an airframe of an aircraft, the closing member comprising:

a closing member body placed on one surface side of the panel and having an external dimension larger than an external dimension of the opening to close the opening;

a ring-shaped clamp member placed on an other surface side of the panel and having an external dimension larger than the external dimension of the opening; and a fastener fastening the closing member body and the clamp member together, with the panel being interposed between an outer peripheral part of the closing member body and an outer peripheral part of the clamp member, and the closing member comprising a first spacer and a second spacer lied between the outer peripheral p art of the closing member body and a facing surface facing the outer peripheral part around the opening, the first spacer being interposed between the outer peripheral part of the closing member body and the facing surface, with the opening closed with the closing member body, and the second spacer being interposed between the outer peripheral part of the closing member body and the facing surface at least in a state in which the first spacer has fallen off, wherein a portion facing the first spacer in the outer peripheral part of the closing member body is formed to have a clearance between the portion and the facing surface in a state in which the first spacer falls off and the second spacer is interposed between the outer peripheral part of the closing member body and the facing surface.

3. The closing member for an opening according to claim 1 or 2, wherein the first spacer and the second spacer are formed of different materials.

4. The closing member for an opening according to claim 1 or 2, wherein the second spacer is formed of a material softer than a material of the first spacer, and is interposed between the outer peripheral part of the closing member body and the facing surface, with the first spacer being interposed between the outer peripheral part of the closing member body and the facing surface.

5. A closing member for an opening formed on a panel configuring an outer surface of an airframe of an aircraft, the closing member comprising:

a closing member body placed on one surface side of the panel and having an external dimension larger than an external dimension of the opening to close the opening;

a ring-shaped clamp member placed on an other surface side of the panel and having an external dimension larger than the external dimension of the opening; and a fastener fastening the closing member body and the clamp member together, with the panel being interposed between an outer peripheral part of the closing member body and an outer peripheral part of the clamp member and the closing member comprising a first spacer and a second spacer lied between the outer peripheral part of the closing member body and a facing surface facing the outer peripheral part around the opening, the first spacer being interposed between the outer peripheral part of the closing member body and the facing surface, with the opening closed with the closing member body, and the second spacer being interposed between the outer peripheral part of the closing member body and the facing surface at least in a state in which the first spacer has fallen off, wherein the second spacer is formed of a material softer than a material of the first spacer, and is interposed between the outer peripheral part of the closing member body and the facing surface, with the first spacer being interposed between the outer peripheral part of the closing member body and the facing surface, wherein a sealing member is provided, the sealing member being in a ring shape continuous in a circumferential direction of the closing member body and ensuring fluid tightness between the outer peripheral part of the closing member body and the facing surface, and wherein the sealing member functions as the second spacer.

6. The closing member for an opening according to claim 5, wherein the sealing member has a core and a seal part formed of a material more pliable than a material of the core.

7. The closing member for an opening according to claim 1, 2, 5, or 6, wherein at least one of the first spacer and the second spacer is in a ring shape continuous in a circumferential direction of the closing member body.

8. The closing member for an opening according to claim 1, 2, 5, or 6, wherein the opening is provided on a main wing configuring the airframe, and is an entrance to or an exit for a fuel tank accommodated in the main wing.

* * * * *